United States Patent
Duncan et al.

[11] Patent Number: 5,892,699
[45] Date of Patent: Apr. 6, 1999

[54] METHOD AND APPARATUS FOR OPTIMIZING DEPENDENT OPERAND FLOW WITHIN A MULTIPLIER USING RECODING LOGIC

[75] Inventors: John L. Duncan, Austin; Albert J. Loper, Jr., Cedar Park, both of Tex.

[73] Assignee: Integrated Device Technology, Inc., Santa Clara, Calif.

[21] Appl. No.: 931,859

[22] Filed: Sep. 16, 1997

[51] Int. Cl.$^6$ .................................................. G06F 7/52
[52] U.S. Cl. ............................. 364/760.01; 364/760.05; 395/562
[58] Field of Search .................. 364/760.05, 760.04, 364/760.03, 760.02, 760.01, 748.09; 395/562, 563

[56] References Cited

U.S. PATENT DOCUMENTS

| | | | |
|---|---|---|---|
| 4,807,175 | 2/1989 | Tokumaru et al. | 364/760.05 |
| 5,619,664 | 4/1997 | Glew | 395/562 |
| 5,638,313 | 6/1997 | Chu | 364/760 |
| 5,748,934 | 5/1998 | Lesartre et al. | 395/563 |
| 5,751,619 | 5/1998 | Agarwal et al. | 364/760.02 |

OTHER PUBLICATIONS

A Signed Binary Multiplication Technique, by Andrew D. Booth, Q.J. Mech. Appl. Math. 4:236–240 (1951).

*Primary Examiner*—David H. Malzahn
*Attorney, Agent, or Firm*—James W. Huffman

[57] ABSTRACT

A method and apparatus for eliminating the setup time typically required for Booth recoding logic is provided. Interlock circuitry detects when a second multiply instruction specifies that the product of a previous multiply instruction is to be used as the multiplier input to the Booth recoding logic. The interlock logic controls mux inputs to both the multiplier path, and the multiplicand path. When the interlock logic detects such a multiplier dependency, the product of the previous multiply instruction is provided to the multiplicand path, and the multiplicand is provided to the multiplier path. The multiplier for the second multiply instruction can therefore be provided to the Booth recoding logic, before the product of the previous multiply instruction is available. The Booth recoding logic is therefore setup, prior to execution of the second multiply instruction.

33 Claims, 3 Drawing Sheets

| Time Interval | Register (R) | ALU (A) | Write Back (W) |
|---|---|---|---|
| 1 | FMUL A,A,B | *** | *** |
| 2-22 | FMUL A,A,C | FMUL A,A,B | *** |
| 23 | | *** | FMUL A,A,B |
| 24-44 | | FMUL A,A,C | *** |
| 45 | | | FMUL A,A,C |

} delay

| Time Interval | Register (R) | ALU (A) | Write Back (W) |
|---|---|---|---|
| 1 | FMUL A,A,B | *** | *** |
| 2-22 | FMUL A,A,C | FMUL A,A,B | *** |
| 23-43 | | FMUL A,C,A | FMUL A,A,B |
| 44 | | | FMUL A,C,A |

METHOD AND APPARATUS FOR OPTIMIZING DEPENDENT OPERAND FLOW WITHIN A MULTIPLIER USING RECODING LOGIC

BACKGROUND OF THE INVENTION

1. Field of the Invention

This invention relates in general to the field of arithmetic units within microprocessors, and more specifically to a method and apparatus for improved execution of sequential multiply instructions using recoding logic.

2. Description of the Related Art

A primary function of microprocessors is to perform a large number of mathematical operations as fast as possible. The mathematical operations within a microprocessor are typically performed by an arithmetic logic unit (ALU). More specifically, data is provided to the ALU in the form of operands that are either stored within the microprocessor, or are retrieved from memory. The operands are manipulated by the ALU in response to an instruction, and a result is provided as an output. The result is then either held in the microprocessor, to be used for subsequent operations, or is stored back into memory. The microprocessor continually reads new operands, associated with new instructions, operates on these operands, and produces a result.

One mathematical operation that has required significant processing time is that of multiplication. A multiply instruction specifies two operands to be multiplied together, to produce a product. One of the operands is called the multiplier, the other operand is called the multiplicand.

Within an arithmetic unit, it is typical for a multiplication to be performed using a process of iterative add/shift operations. As will be further described in the Detailed Description below, the multiplicand is added/shifted depending on the contents of the multiplier.

A problem with the iterative add/shift process is that a microprocessor time interval is typically required for each bit in the multiplier. Thus, if a multiplier is a 32-bit value, at least 32 time intervals are required to perform the multiplication.

An improvement in microprocessor multiplication has been obtained by using recoding logic to reduce the number of iterations required for a multiply. The recoding logic implements a particular algorithm designed to optimize multiplication within an arithmetic unit. One such algorithm is that of Andrew Booth, discussed below, and is termed the Booth algorithm. Implementation of recoding logic using Booth's algorithm is ubiquitous within microprocessor arithmetic units. For a recent example, see U.S. Pat. No. 5,638,313 entitled "BOOTH MULTIPLIER WITH HIGH SPEED OUTPUT CIRCUITRY", by Chu, which is hereby incorporated by reference.

The recoding logic is typically provided with a multiplier operand that sets up the recoding logic to control a sequence of add/shift operations executed on a multiplicand. However, all known recoding logic requires a non zero setup time, after receiving the multiplier, before it can begin controlling the add/shift operations on the multiplicand. This setup time creates processing delays during a multiply instruction.

The setup time is particularly cumbersome when a multiply instruction specifies that its multiplier is the product of a previous multiply instruction. Until the product of the previous multiply instruction has been calculated, and the product is provided to the recoding logic, the recoding logic cannot be setup to perform the subsequent multiply. This additional delay in setting up the recoding logic, when an operand dependency is specified by a multiply instruction, adds additional processing delay. Such delay, resulting from setting up the recoding logic with the product of a previous multiply, is undesirable.

Therefore, what is needed is a method and apparatus that allows operand dependencies in sequential multiply operations to be detected, and the setup time for the recoding logic, typically associated with such dependencies, to be eliminated.

SUMMARY

To address the above-detailed deficiencies, it is an object of the present invention to provide a method and apparatus that eliminates setup dependency for recoding logic, when a product from a previous multiply instruction is specified as a multiplier in a subsequent multiply instruction.

Accordingly, in the attainment of the aforementioned object, it is a feature of the present invention to provide an arithmetic unit for executing sequential multiply instructions. The arithmetic unit includes a first operand path, a second operand path, recoding logic, add/shift logic, a result register, a forward bus, and interlock logic. The first operand path transmits multiplier operands to the recoding logic. The second operand path transmits multiplicand operands to the add/shift logic. The recoding logic utilizes the multiplier operands to control the add/shift logic according to Booth's algorithm. The add/shift logic produces a product of the multiplier provided to the recoding logic, and the multiplicand provided to the add/shift logic, and stores the product into the result register. The forward bus forwards the product back around to the add/shift logic to be selectively used as a multiplicand for subsequent multiply instructions. The Interlock logic detects when a product of a first multiply instruction is designated in a second multiply instruction as a multiplier operand in the first operand path, and selectively provides the multiplier operand as a multiplicand operand in the second operand path.

An advantage of the present invention is that the recoding logic may be set up for the second multiply instruction before the product of the first multiply instruction has been produced.

A further advantage is that the time critical path through the arithmetic unit (i.e., through the recoding logic) is not required to wait on the result of a previous multiply instruction, even when the second multiply instruction specifies that the product of the previous multiply instruction is to be used as the multiplier.

In another aspect, it is a feature of the present invention to provide a microprocessor configured to perform sequential multiply operations, where the sequential multiply operations include a first multiply instruction that specifies a first multiplier and a first multiplicand to produce a first product, and includes a second multiply instruction that specifies a second multiplier and a second multiplicand to produce a second product, and where the second multiplier specified is the first product. The microprocessor includes recoding logic, add/shift logic, a forward bus, and interlock logic. The recoding logic is configured to receive the first multiplier. The add/shift logic is coupled to the recoding logic, and is configured to receive the first multiplicand, and in response to control signals from the recoding logic, to produce the first product. The forward bus is coupled to the add/shift logic, and is configured to forward the first product back to the add/shift logic. The interlock logic is coupled to the recoding logic, and to the add/shift logic, and is configured to detect if the second multiplier is the first product, and if it is, causes the second multiplicand to be provided to the recoding logic as a multiplier, and causes the first product to be used by the add/shift logic as a multiplicand, to produce the second product.

In yet another aspect, it is a feature of the present invention to provide a floating point arithmetic logic unit that includes an instruction register, a register file, a multiplier path, a multiplicand path, multiply logic, a result register, a forward bus, and interlock logic. The instruction register is configured to temporarily store a first multiply instruction, and subsequently to store a second multiply instruction, wherein each of the multiply instructions specify two source operands, a first one to be used as a multiplier, and a second one to be used as a multiplicand. The register file is coupled to the instruction register, and is configured to retrieve the source operands specified by the multiply instructions. The multiplier path is coupled to the register file and is configured to transmit the multiplier operands. The multiplicand path is coupled to the register file, and is configured to transmit the multiplicand operands. The multiply logic is coupled to both the multiplier path and the multiplicand path, and is configured to multiply the multiplicand operands by the multiplier operands, and calculate a first product, corresponding to the first multiply instruction, and a second product, corresponding to said the multiply instruction. The result register is coupled to the multiply logic to temporarily store the products, one at a time. The forward bus is coupled to the result register, and to the multiplicand path, to provide the products to the multiply logic as subsequent multiplicands. The interlock logic is coupled to the multiplier path, to the multiplicand path, and to the instruction register, and is configured to determine whether the multiplier specified by the second multiply instruction is the first product, and if it is, to produce a multiplicand switch signal. The multiplicand switch signal causes the second operand associated with the second multiply instruction to be provided to the multiplier path, and the first product to be provided to the multiplicand path, for execution of the second multiply instruction.

An advantage of the present invention is that the setup time typically required for the recoding logic is not delayed when having to wait for the product of a previous multiply instruction to be provided as a multiplier.

In another aspect, it is a feature of the present invention to provide a method for improving the execution speed within a microprocessor of a second multiply instruction, whose source operand is dependent on the product of a first multiply instruction. The method includes determining whether the second multiply instruction specifies a multiplier operand that is a product of the first multiply instruction, and if so, utilizing the product of the first multiply instruction as a multiplicand of the second multiply instruction, and utilizing a multiplicand, specified by the second multiply instruction as a multiplier or the second multiply instruction.

BRIEF DESCRIPTION OF THE DRAWINGS

These and other objects, features, and advantages of the present invention will become better understood with regard to the following description, and accompanying drawings where.

DETAILED DESCRIPTION

Multiplication of two fixed-point binary numbers in signed-magnitude representation is performed manually by a process of successive shift and add operations. This process is best illustrated with a numerical example.

```
    23          1 0 1 1 1   Multiplicand
   x19          1 0 0 1 1   Multiplier
                1 0 1 1 1
              1 0 1 1 1
            0 0 0 0 0
          0 0 0 0 0
        1 0 1 1 1
   437   1 1 0 1 1 0 1 0 1   Product
```

The process consists of looking at successive bits of the multiplier, least significant bit first. If the multiplier bit is a 1, the multiplicand is copied down; otherwise, zeros are copied down. The numbers copied down in successive lines are shifted one position to the left from the previous number. Finally, the numbers are added and their sum forms the product. The sign of the product is determined from the signs of the multiplicand and multiplier. If they are alike, the sign of the product is positive. If they are not alike, the sign of the product is negative.

When multiplication is implemented in a digital computer, it is convenient to change the process slightly. First, instead of providing registers to store and add simultaneously as many binary numbers as there are bits in the multiplier, it is convenient to provide an adder for the summation of only two binary numbers and successively accumulate the partial products in a register. Second, instead of shifting the multiplicand to the left, the partial product is shifted to the right, which results in leaving the partial product and the multiplicand in the required relative positions.

Figure 1:
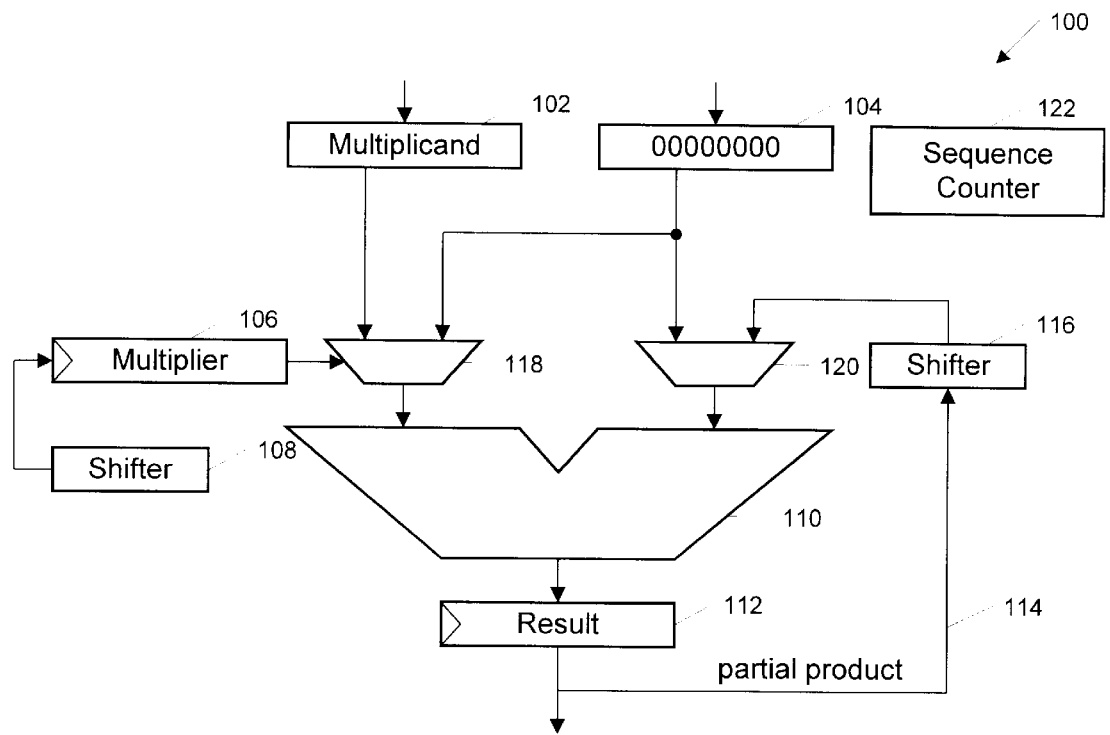
FIG. 1 is a block diagram of logic associated with a related art multiplier.

Referring to FIG. 1, a hardware implementation of a related art multiplication circuit 100 is provided. The circuit 100 includes a multiplicand register 102, a zero register 104, a multiplier register 106, a shifter 108, an adder 110, a result register 112, a partial product forward bus 114, a second shifter 116, two muxes 118, 120, and a sequence counter 122. Operation of the circuit 100 is as follows.

The sequence counter 122 is initially set to the number of bits in the multiplier. The multiplier is then stored into the multiplier register 106, and the multiplicand is stored into the multiplicand register 102. The right most bit in the multiplier register controls whether the multiplicand will be provided to the adder 110, or whether 0's will be provided to the adder 110. Using the example provided above, the contents of the multiplier register 106 are 10011, and the contents of the multiplicand register 102 are 10111. In addition, the sequence counter 122 has a value of 101 (5).

For the first iteration of the add sequence, the multiplicand is selected by the mux 118 to be provided to the adder 110, and the mux 120 selects 0's to be provided to the adder 110.

Thereafter, the mux 118 selects either the multiplicand or 0's to be provided to the adder 110 depending on the right most bit of the multiplier register 106. And, the mux 120 selects the shifted partial product to be provided to the adder 110. For each iteration of the sequence, the shifter 108 shifts the multiplier in the multiplier register 106 1-bit to the right, the shifter 116 shifts the partial product provided by the result register 112 1-bit to the right, and the sequence counter is decremented by 1. The multiply operation is complete when the sequence counter reaches zero.

The circuit 100 described above provides a general understanding of how multiply operations occur within a hardware circuit. One skilled in the art will appreciate that the number of iterations required to perform a multiply is based on the number of bits contained in the multiplier. For example, if the multiplier is a 16-bit number, 16 iterations are required. In modern microprocessors, it is not uncommon for a 32-bit, or a 64-bit number to be used as a multiplier, thus requiring 32 or 64 iterations of the add sequence to perform the multiply operation. Such iterative addition to perform a multiplication is very time consuming.

An improvement to the iterative sequence described above has been provided by Andrew D. Booth in a paper entitled "A SIGNED BINARY MULTIPLICATION TECHNIQUE" Q. J. Mech. Appl. Math. 4:236–240 (1951), which is hereby incorporated by reference. The paper describes a procedure, commonly referred to as the Booth Algorithm, for multiplying binary integers in signed-2's complement representation. It operates on the fact that strings of 0's in the multiplier require no addition but just shifting, and a string of 1's in the multiplier from bit weight $2^k$ to weight $2^m$ can be treated as $2^{k+1}-2^m$. For example, the binary number 001110 (+14) has a string of 1's from $2^3$ to $2^1$ (k=3, m=1). The number can be represented as $2^{k+1}-2^m=2^4-2^1=16-2=14$. Therefore, the multiplication M×14, where M is the multiplicand and 14 the multiplier, can be done as M×$2^4$-M×$2^1$. Thus the product can be obtained by shifting the binary multiplicand M four times to the left and subtracting M shifted left once.

Figure 2:
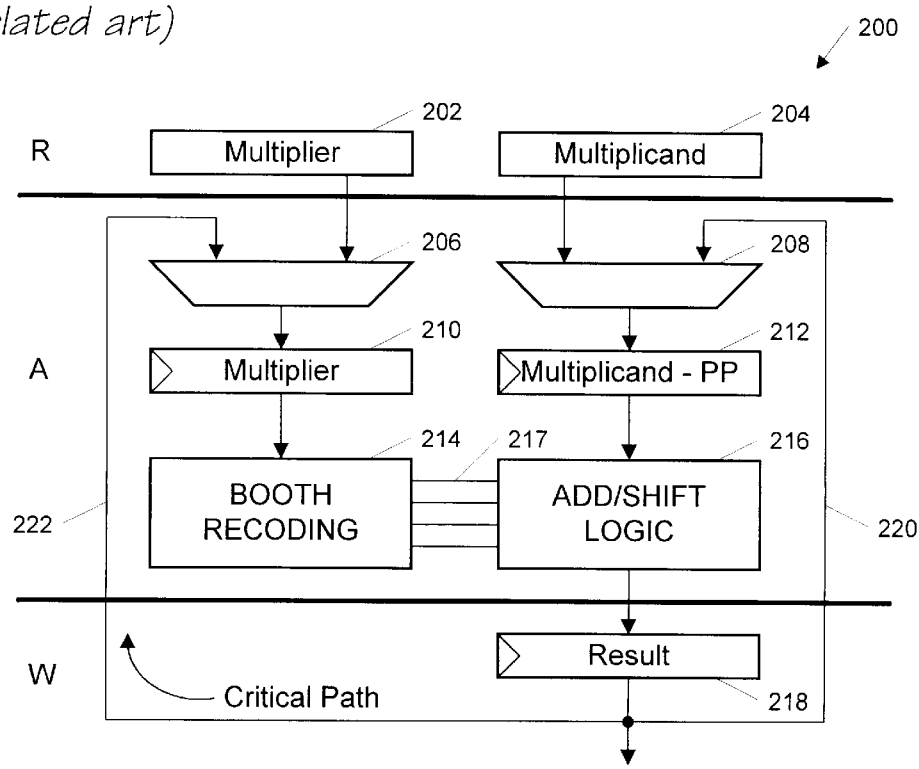
FIG. 2 is a portion of a floating point arithmetic unit within a pipeline microprocessor.

A hardware circuit for implementing the Booth algorithm, within an arithmetic logic unit of a pipeline microprocessor 200, is provided in FIG. 2, to which attention is now directed. The implementation illustrates a 3-stage pipeline, having a register (R) stage, and ALU (A) stage, and a write back (W) stage. Other stages within the microprocessor 200 have been removed for purposes of clarity.

The circuit includes a multiplier register 202, and a multiplicand register 204, for temporarily storing a multiplier, and a multiplicand, respectively. While not shown, it is understood that the contents of the registers 202, 204 are filled from a register file, or a memory, as specified by a multiply instruction. The contents of the register 202 are provided to a mux 206 that is connected to a multiplier register 210. The multiplier register 210 is connected to the input of Booth recoding logic 214. The contents of the register 204 are provided to a mux 208 that is connected to a multiplicand-PP register 212. The contents of the multiplier register 212 are provided to add/shift logic 216. The add/shift logic 216 is controlled, via a bus 217, by the Booth recoding logic 214. One skilled in the art will appreciate that the Booth recoding logic 214 controls shifting and addition of the multiplicand, and partial products (PP) in the add/shift logic 216, to produce the product of the multiply instruction. The product of a multiply operation is provided to a result register 218. During the write back stage, the product in the result register 218 is written into either a register file, or a memory, as designated by the multiply instruction.

If a subsequent multiply instruction specifies either a multiplier or a multiplicand, that is a product of a previous multiply instruction, and the product has not yet been written into the register file, or memory, the contents of the result register 218 are provided to the mux 206, via bus 222, and the mux 208, via bus 220. Using selection logic (not shown), the muxes can select the product of the previous multiply instruction to be used as either a multiplier or a multiplicand as specified by the subsequent multiply instruction. By forwarding the product in the result register 218 back to the multiplier path, and the multiplicand path, delays or stalls typically associated with operand dependencies in the pipeline microprocessor 200 are reduced.

While the Booth recoding logic 214 has significantly improved the performance of multiply operations, it requires a non zero setup time after receiving a multiplier, before it can generate appropriate control signals to the add/shift logic 216. Thus, if a multiplier is provided to the Booth recoding logic 214 at the same time a multiplicand is provided to the add/shift logic, the add/shift logic cannot begin operation, even though it has received the multiplicand, until receiving control signals via the bus 217, from the Booth recoding logic 214.

This delay is exacerbated when a subsequent multiply instruction specifies a multiplier that is a product of a previous multiply operation, and that product has not yet been written into a register file. This is particularly illustrated in FIG. 3, to which attention is now directed.

Figures 3, 4:
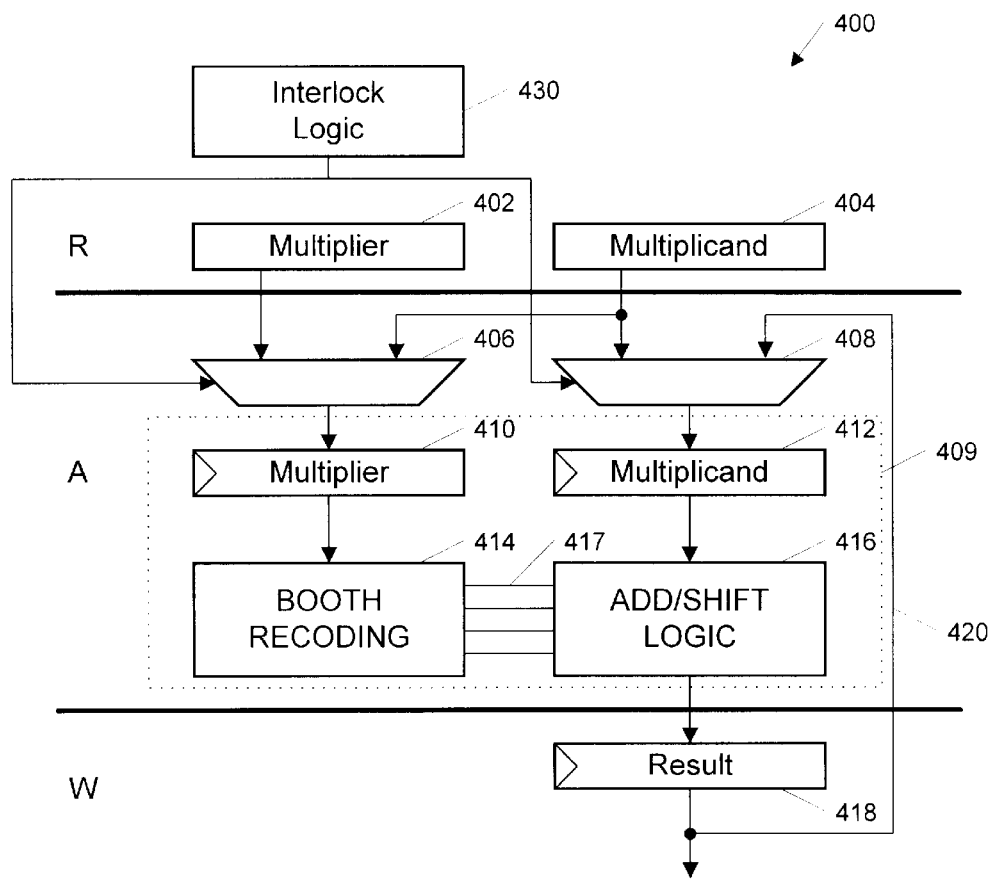
FIG. 3 is a table illustrating sequential multiply operations executing in the pipeline microprocessor of FIG. 2.
FIG. 4 is a portion of an arithmetic unit, according to the present invention, within a pipeline microprocessor.

A table 300 in FIG. 3 illustrates progression of two floating point multiply instructions through the pipeline microprocessor illustrated in FIG. 2. One skilled in the art will appreciate that the time interval chosen is relative to the internal clock speed of the particular microprocessor executing the floating point multiply. The first multiply instruction, FMUL A,A,B, specifies that a multiply operation is to be performed, that the multiplier source is register A within a register file (not shown), that the multiplicand source is register B within the register file, and that the product of the multiply operation is to be stored back into register A. Thus, during the first time interval, the operands in registers A and B are provided to the multiplier register 202, and the multiplicand register 204, respectively. Presuming that the multiplier is a 16-bit number (requiring 16 time intervals, plus 4 additional time intervals for overhead), the first multiply instruction remains in the ALU stage for time intervals 2–22.

During time intervals 2–22, a second multiply instruction, FMUL A,A,C progresses to the register stage. It specifies a multiply operation using the contents of the A register as a multiplier, the contents of the C register as a multiplicand, with the product of the multiply to be stored back in the A register. The second multiply instruction remains in the register stage of the pipeline until the first multiply instruction completes, and stores its product in the result register 218. One skilled in the art should appreciate that at this point, the contents of the multiplier register 202 are incorrect, because the new value for A (calculated from the first multiply instruction) has not yet been written into the register file. Therefore, the mux 206 selects the value on the forward bus 222 to be provided to the multiplier register 210.

Execution of the second multiply instruction cannot begin, however, because the Booth recoding logic 214 has not yet had time to setup to control the add/shift logic 216. Although setup time for Booth recoding logic 214 varies, depending on the implementation, for ease of illustration this setup time is shown to require an additional time interval, i.e., time interval 23. Thus, the second multiply instruction does not really begin until time interval 24, and continues in the ALU stage until time interval 44. During time interval 45, the product of the second multiply instruction is written back into register A.

In the example provided in table 300, when a second multiply instruction specifies a multiplier that is a product of a prior multiply instruction, a delay occurs in the pipeline because of the setup time required by the Booth recoding logic 214. The path from the result register 218 back to the multiplier path, through the Booth recoding logic 214 is therefore termed the critical path within the multiplier. Although attempts have been made to reduce the setup time required by the Booth recoding logic, all known implementations still require a non zero setup time. When operand dependencies exist between sequential multiply instructions, this setup time creates processing delays.

Attention is now directed to FIG. 4 that illustrates a microprocessor 400 incorporating the present invention. In FIG. 4, like elements have like numbers as described with reference to FIG. 2, with the hundreds digit replaced with a 4. The microprocessor 400 contains a multiplier 409 having Booth recoding logic 414 and add/shift logic 416, similar to that described above with reference to FIG. 2. In addition, interlock logic 430 has been provided in the register stage of the microprocessor, for detecting operand dependencies in sequential instructions, and for controlling the mux selects for muxes 406, 408. Further, the mux 406 is no longer connected to the result register 418. Rather, the second input to the mux 406 is from the multiplicand register 404. Thus, the only forward path provided from the result register 418 is to the input of the multiplicand path at the mux 408. Operation of the microprocessor 400 will now be illustrated with reference to the instruction stream shown in FIG. 5.

Figures 5, 6:
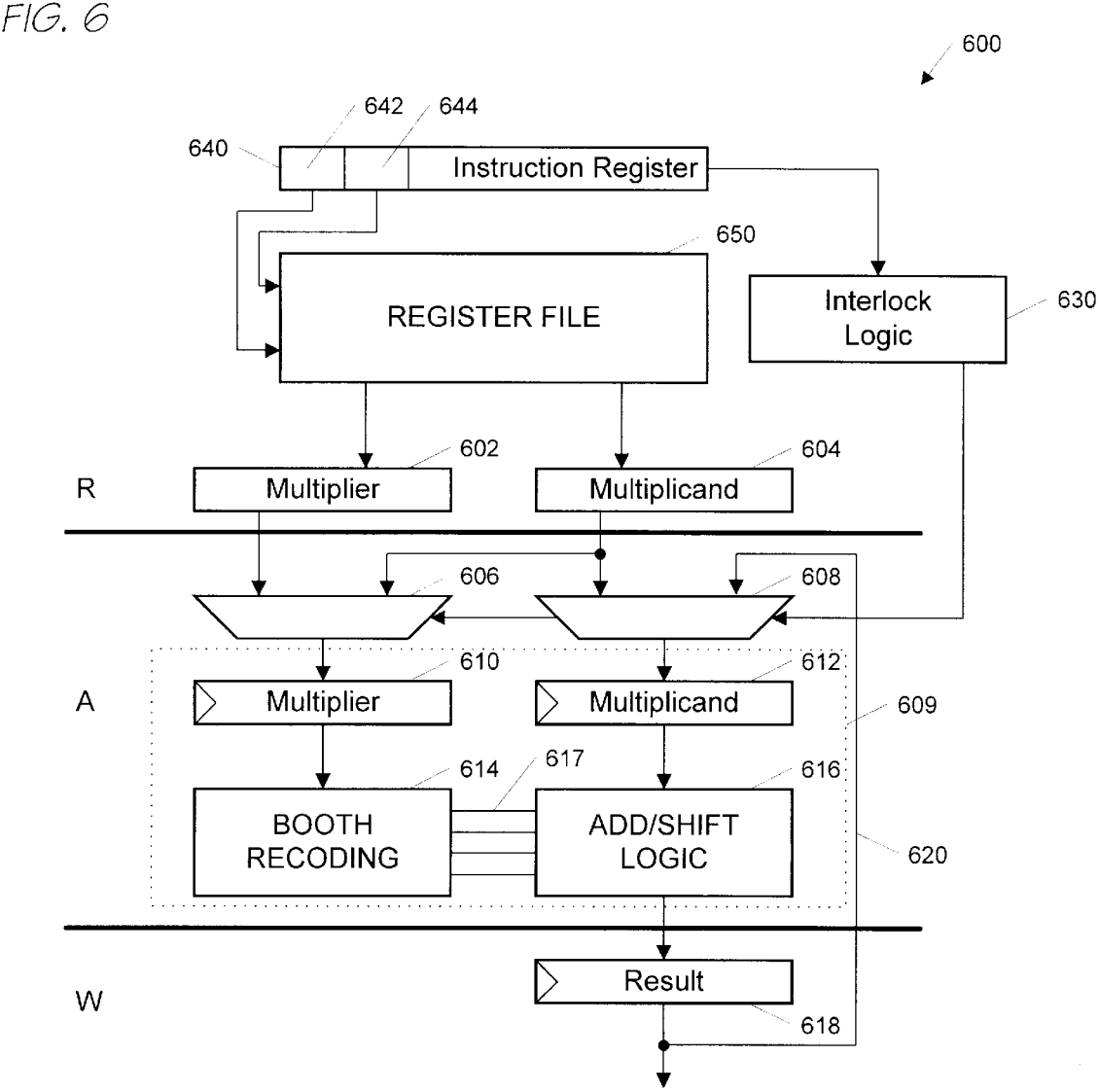
FIG. 5 is a table illustrating sequential multiply operations executing in the pipeline microprocessor of FIG. 4.
FIG. 6 is a portion of a pipeline microprocessor, incorporating the arithmetic unit of the present invention.

FIG. 5 shows a first multiply instruction, FMUL A,A,B, followed by a second multiply instruction, FMUL A,A,C, for execution within the microprocessor 400. During a first time interval, the first multiply instruction retrieves the multiplier operand from register A, and the multiplicand operand from register B, and provides them to the multiplier register 402, and the multiplicand register 404. During time intervals 2–22, the multiplier 409 performs the multiplication, and provides the product of the multiply to the result register 418.

In addition, the second multiply instruction progresses through the register stage, and retrieves the operands from registers A and C, and places them in the registers 202, 204 respectively. As before, the contents of register A are incorrect because the first multiply instruction has not yet written the product back into the register file.

At this point, the interlock logic 430 detects that the multiplier operand A, specified by the second multiply instruction, is the product of the first multiply instruction. Rather than waiting until the product of the first multiply instruction is forwarded to the Booth recoding logic 414, and waiting for the Booth recoding logic to setup for the second multiply instruction, as described above with reference to FIG. 2, the interlock logic causes the multiplicand in register 404 to be selected as the multiplier for the second multiply instruction.

In addition, the interlock logic 430 causes the product in the result register 418 to be selected as the output of the mux 408 for the second multiply instruction. Thus, for the second multiply instruction, the specified multiplier A is provided to the multiplicand path, and the specified multiplicand C is provided to the multiplier path. This is particularly illustrated in table 500 during time intervals 23–43 in the ALU stage. One skilled in the art will appreciate that the order of multiplier/multiplicand is not important, i.e., A×C=C×A. Thus, by detecting operand dependencies for sequential multiply instructions, and switching a dependent multiplier operand to the multiplicand path, and vice versa, for subsequent multiply instructions, setup time for the Booth recoding logic can be effectively eliminated.

Referring now to FIG. 6, a microprocessor 600 is shown that particularly illustrates the present invention, as shown in FIG. 4, with like elements having like numbers, the hundreds digit replaced with a 6. In addition, an instruction register 640 is shown having two operand specifiers 642, 644. The operand specifiers 642, 644 designate the multiplier and multiplicand for a multiply instruction, for example. They are provided as inputs to a register file 650. In one embodiment, the register file 650 is a register stack, similar to the floating point stack register in x86 compatible microprocessors. The register file 650 provides two outputs, connected to a multiplier register 602, and a multiplicand register 604.

Also connected to the instruction register 640 is the interlock logic 630. The interlock logic 630 continually monitors instructions, and operands in the instruction register 640, and detects when dependencies exists between sequential instructions, as described above.

Although the present invention and its objects, features, and advantages have been described in detail, other embodiments are encompassed by the invention. For example, the present invention has been described by reference to an arithmetic unit within a pipeline microprocessor. However, it should be appreciated that the use of interlock logic to detect operand dependencies, and to switch multiplier/multiplicand paths when dependencies occur, to eliminate setup time of multiplier recoding logic, is applicable to any multiplication circuitry using recoding logic to control multiplication. Moreover, specific multiplier/multiplicand registers, and muxes, have been shown to help illustrate the multiplier/multiplicand paths within an arithmetic unit. It should be appreciated that some of these registers can be removed, or incorporated directly into the recoding logic, or the add/shift logic, without departing from spirit of the present invention. Furthermore, the described embodiment has placed the functional blocks of the present invention within particular stages of a pipeline microprocessor. The particular stages into which the circuitry of the present invention is placed is not important. Rather, the detection of operand dependencies, and multiplier/multiplicand path control to eliminate setup time in the recoding logic, could occur in other stages, or could be combined into a single stage.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An arithmetic unit for executing sequential multiply instructions, the arithmetic unit comprising:

a first operand path;

a second operand path;

recoding logic coupled to said first operand path for receiving a multiplier;

add/shift logic coupled to said second operand path and to said recoding logic for receiving a multiplicand;

a result register coupled to said add/shift logic for temporarily storing a product;

a forward bus coupled to said result register and to said second operand path for forwarding said product back to said second operand path; and interlock logic coupled to said first operand path and to said second operand path for detecting when a product of a first multiply instruction is designated in a second multiply instruction as a multiplier operand in said first operand path, and for selectively providing said multiplier operand as a multiplicand operand in said second operand path.

2. The arithmetic unit as recited in claim 1 wherein said first operand path comprises:

a multiplier register for temporarily storing a multiplier designated by multiply instructions.

3. The arithmetic unit as recited in claim 2 wherein said first operand path further comprises:

a mux coupled to said multiplier register and to said second operand path for selecting either data in said multiplier register, or in said second operand path, to be used as a multiplier for said recoding logic.

4. The arithmetic unit as recited in claim 3 wherein said mux is also coupled to said interlock logic for receiving a selection signal therefrom.

5. The arithmetic unit, as recited in claim 1 wherein said second operand path comprises:

a multiplicand register for temporarily storing a multiplicand designated by multiply instructions.

6. The arithmetic unit as recited in claim 5 wherein said second operand path further comprises:

a mux coupled to said multiplicand register and to said forward bus for selecting either data in said multiplicand register, or said product provided by said forward bus, to be used as a multiplicand for said add/shift logic.

7. The arithmetic unit as recited in claim 6 wherein said mux is also coupled to said interlock logic for receiving a selection signal therefrom.

8. The arithmetic unit as recited in claim 1 wherein said recoding logic comprises a Booth recoder.

9. The arithmetic unit as recited in claim 8 wherein said Booth recoder requires a non-zero setup time before providing control information to said add/shift logic.

10. The arithmetic unit as recited in claim 9 wherein said control information causes said add/shift logic to perform repetitive add/shift operations on said multiplicand according to a Booth algorithm.

11. The arithmetic unit as recited in claim 1 wherein said product is the result of the arithmetic unit multiplying said multiplicand by said multiplier.

12. The arithmetic unit as recited in claim 1 wherein said forward bus does not forward said product to said first operand path.

13. The arithmetic unit as recited in claim 1 wherein when said interlock logic detects that said product of said first multiply instruction is designated as said multiplier operand in said second multiply instruction, said interlock logic causes a multiplicand operand in said second multiply instruction to be provided as a multiplier to said first operand path.

14. The arithmetic unit as recited in claim 13 wherein said multiplicand operand in said second multiply instruction is provided to said first operand path prior to said multiplier operand being provided to said second operand path.

15. A microprocessor configured to perform sequential multiply operations, the sequential multiply operations including a first multiply instruction specifying a first multiplier and a first multiplicand to produce a first product, and including a second multiply instruction specifying a second multiplier and a second multiplicand to produce a second product, wherein the second multiplier specified is the first product, the microprocessor comprising:

recoding logic configured to receive said first multiplier;

add/shift logic coupled to said recoding logic configured to receive said first multiplicand and in response to control signals from said recoding logic to produce said first product;

a forward bus coupled to said add/shift logic configured to forward said first product back to said add/shift logic; and interlock logic coupled to said recoding logic and to said add/shift logic configured to detect if said second multiplier is said first product, and if it is, causing said second multiplicand to be provided to said recoding logic as a multiplier, and causing said first product to be used by said add/shift logic as a multiplicand to produce said second product.

16. The microprocessor as recited in claim 15 wherein said second multiply instruction immediately follows said first multiply instruction.

17. The microprocessor as recited in claim 15 wherein said recoding logic comprises logic to control said add/shift logic according to the Booth algorithm.

18. The microprocessor as recited in claim 15 wherein said recoding logic requires a non zero setup time after receiving said first multiplier before providing said control signals to said add/shift logic.

19. The microprocessor as recited in claim 18, wherein by causing said second multiplicand to be provided to said recoding logic for said second multiply instruction any delay typically associated with using said first product as said second multiplier is negated.

20. The microprocessor as recited in claim 15 further comprising:

mux selection logic coupled to said forward bus said recoding logic and said add/shift logic configured to select said first product as an input to said add/shift logic and said second multiplicand as an input to said recoding logic for said second multiply instruction upon command from said interlock logic.

21. A floating point arithmetic logic unit comprising:

an instruction register configured to temporarily store a first multiply instruction and subsequently to store a second multiply instruction wherein each of said multiply instructions specify two source operands, a first one to be used as a multiplier, and a second one to be used as a multiplicand;

a register file coupled to said instruction register configured to retrieve said source operands specified by said multiply instructions;

a multiplier path coupled to said register file configured to transmit said multiplier operands;

a multiplicand path coupled to said register file configured to transmit said multiplicand operands;

multiply logic coupled to both of said multiplier path and said multiplicand path configured to multiply said multiplicand operands by said multiplier operands and calculate a first product corresponding to said first multiply instruction and a second product corresponding to said second multiply instruction;

a result register coupled to said multiply logic for temporarily storing said products, one at a time;

a forward bus coupled to said result register and to said multiplicand path to provide said products to said multiply logic as subsequent multiplicands; and interlock logic coupled to said multiplier path to said multiplicand path and to said instruction register configured to determine whether said multiplier specified by said second multiply instruction is said first product, and if it is, to produce a multiplicand switch signal;

wherein said multiplicand switch signal causes said second operand associated with said second multiply instruction to be provided to said multiplier path, and said first product to be provided to said multiplicand path, for execution of said second multiply instruction.

22. The floating point arithmetic unit as recited in claim 21 wherein said instruction register further stores a destination operand for each of said multiply instructions specifying a destination within said register file for each of said products.

23. The floating point arithmetic unit as recited in claim 21 wherein said register file is a register stack.

24. The floating point arithmetic unit as recited in claim 21 wherein said register file comprises two output ports, a first one coupled to said multiplier path corresponding to said first source operands, and a second one coupled to said multiplicand path corresponding to said second source operands.

25. The floating point arithmetic unit as recited in claim 24 wherein said second output port is also coupled to said multiplier path.

26. The floating point arithmetic unit as recited in claim 21 wherein said multiplier path comprises a mux coupled to said register file for receiving either of source operands specified by said multiply instructions.

27. The floating point arithmetic unit as recited in claim 21 wherein said multiplicand path comprises a mux coupled to said register file and to said forward bus for receiving either said first product or said second multiplicand corresponding to said second multiply instruction.

28. The floating point arithmetic unit as recited in claim 21 wherein said multiply logic further comprises:

Booth recoding logic; and add/shift logic, coupled to said Booth recoding logic;

wherein said Booth recoding logic utilizes data provided by said multiplier path to cause said add/shift logic to operate upon data provided by said multiplicand path, to produce products, according to Booth's algorithm.

29. The floating point arithmetic unit as recited in claim 28 wherein said Booth recoding logic requires a non zero setup time after receiving either of said multiplier operands before causing said add/shift logic to operate upon said data provided by said multiplicand path.

30. The floating point arithmetic unit as recited in claim 29 wherein by providing said second operand associated with said second multiply instruction to said multiplier path said Booth recoding logic is not required to wait for said add/shift logic to produce said first product before setting up for said second multiply instruction.

31. A method for improving the execution speed within a microprocessor of a second multiply instruction, dependent on the product of a first multiply instruction, the method comprising the steps of:

determining whether the second multiply instruction specifies a multiplier operand that is a product of the first multiply instruction, and if so;

utilizing the product of the first multiply instruction as a multiplicand of the second multiply instruction; and utilizing a multiplicand, specified by the second multiply instruction as a multiplier for the second multiply instruction.

32. The method for improving the execution speed of a second multiply instruction as recited in claim 31 wherein said step of utilizing the multiplicand, begins prior to said step of utilizing the product of the previous multiply.

33. The method for improving the execution speed of a second multiply instruction as recited in claim 31 wherein the second multiply instruction immediately follows the first multiply instruction.

* * * * *